US012665209B2

(12) United States Patent
Wiekamp

(10) Patent No.: US 12,665,209 B2
(45) Date of Patent: Jun. 23, 2026

(54) HYDROGEN PRODUCTION SYSTEM AND METHOD

(71) Applicant: HiiROC-X Developments Limited, Tunbridge Wells (GB)

(72) Inventor: Jan Hendrik Ate Wiekamp, Tunbridge Wells (GB)

(73) Assignee: HiiROC-X Developments Limited, Tunbridge Wells (GB)

( * ) Notice: Subject to any disclaimer, the term of this patent is extended or adjusted under 35 U.S.C. 154(b) by 567 days.

(21) Appl. No.: 18/170,150

(22) Filed: Feb. 16, 2023

(65) Prior Publication Data

US 2023/0268538 A1      Aug. 24, 2023

(30) Foreign Application Priority Data

Feb. 18, 2022     (GB) ..................................... 2202227

(51) Int. Cl.
| | |
|---|---|
| *H01M 8/0612* | (2016.01) |
| *B01D 53/047* | (2006.01) |
| *C01B 3/24* | (2006.01) |
| *C01B 3/56* | (2006.01) |
| *H01M 8/0662* | (2016.01) |

(52) U.S. Cl.
CPC ........ *H01M 8/0631* (2013.01); *B01D 53/047* (2013.01); *C01B 3/24* (2013.01); *C01B 3/56* (2013.01); *H01M 8/0662* (2013.01); *C01B 2203/0272* (2013.01); *C01B 2203/0425* (2013.01); *C01B 2203/066* (2013.01); *C01B 2203/0816* (2013.01); *C01B 2203/0883* (2013.01); *C01B 2203/1241* (2013.01)

(58) Field of Classification Search
None
See application file for complete search history.

(56) References Cited

U.S. PATENT DOCUMENTS

| | | |
|---|---|---|
| 5,409,784 A | 4/1995 | Bromberg et al. |
| 5,484,978 A | 1/1996 | Hedberg et al. |
| (Continued) | | |

FOREIGN PATENT DOCUMENTS

| | | |
|---|---|---|
| CN | 107808967 A | 3/2018 |
| EP | 3560888 A1 | 10/2019 |
| (Continued) | | |

OTHER PUBLICATIONS

Egyptian Patent Office, Examination Report in counterpart application EG/P/2023/00266, issued Jan. 19, 2025.

(Continued)

*Primary Examiner* — Colin W. Slifka
(74) *Attorney, Agent, or Firm* — Kim IP Law Group LLC

(57)     ABSTRACT

A hydrogen production system comprises a hydrogen pyrolysis reactor which has a hydrocarbon input, an electrical input and at least one hydrogen output. The hydrogen production system also comprises a hydrogen-fuelled generator. Means are provided to route part of the hydrogen from one of the at least one hydrogen outputs to the hydrogen-fuelled generator. The hydrogen-fuelled generator then generates an electrical output, which is routed to the electrical input of the hydrocarbon pyrolysis reactor. A related method of operating a hydrogen production system is also described.

19 Claims, 9 Drawing Sheets

(56) References Cited

U.S. PATENT DOCUMENTS

| | | | |
|---|---|---|---|
| 5,527,632 A * | 6/1996 | Gardner | H01M 8/2457 |
| | | | 429/432 |
| 6,653,005 B1 | 11/2003 | Muradov | |
| 8,718,814 B1 | 5/2014 | Clark et al. | |
| 2006/0168950 A1 | 8/2006 | Taylor et al. | |
| 2007/0267289 A1 * | 11/2007 | Jabs | B01J 19/088 |
| | | | 204/170 |
| 2008/0156630 A1 | 7/2008 | Lee et al. | |
| 2008/0213637 A1 | 9/2008 | Steinberg | |
| 2009/0035619 A1 | 2/2009 | Adams | |
| 2014/0292234 A1 | 10/2014 | Nishida et al. | |
| 2016/0365591 A1 * | 12/2016 | Goebel | H01M 8/0668 |

FOREIGN PATENT DOCUMENTS

| | | |
|---|---|---|
| JP | 2003206102 A | 7/2003 |
| WO | 00/21878 A1 | 4/2000 |
| WO | 2021/195566 A1 | 9/2021 |
| WO | 2022/129736 A1 | 6/2022 |

OTHER PUBLICATIONS

Search Report in counterpart United Kingdom Patent Application No. 2202227.1, mailed Jul. 29, 2022.

Examination Report in counterpart United Kingdom Patent Application No. 2202227.1, mailed Aug. 8, 2024.

United Kingdon Intellectual Property Office, Examination Report in counterpart application GB2202227.1, mailed Feb. 28, 2024.

Saudi Authority for Intellectual Property, Notification of the Substantive Examination Report in counterpart application SA123441250, dated Mar. 13, 2024.

Saudi Authority for Intellectual Property, Notification of the Substantive Examination Report in counterpart application SA123441250, dated Nov. 17, 2025.

* cited by examiner

128

121

HYDROGEN PRODUCTION SYSTEM AND METHOD

FIELD OF INVENTION

The invention relates to a hydrogen production system.

BACKGROUND TO INVENTION

Power and heating for buildings and other installations has primarily been provided by hydrocarbons in the form of oil and gas, but alternatives to this approach are being sought as use of hydrocarbons for such purposes is now being steadily reduced. Electricity provision is increasingly provided from renewable sources, but this is not always the most efficient approach-local power generation would often be desirable for control and for management of cost. Hydrogen is increasingly attractive for use as a fuel, as it releases energy very efficiently and without harmful waste products. Hydrogen boilers for use in buildings are currently entering production. Electricity can also be generated from hydrogen, for example using solid oxide fuel cells.

Processes have been developed to obtain hydrogen from hydrocarbons—this has typically been done up to now in large reactors which are not suitable for use within most built environments. It would be desirable to be able to provide hydrogen into environments in a way that did not rely on offsite creation of hydrogen and hydrogen delivery. It would be particularly desirable to do this in a way that enabled a hydrogen production system to be used in as versatile a way as possible, both in a built environment and in other contexts where its use may not previously have been considered.

SUMMARY OF INVENTION

In a first aspect, the invention provides a hydrogen production system comprising: a hydrocarbon pyrolysis reactor having a hydrocarbon input, an electrical input and at least one hydrogen output; a hydrogen-fuelled generator, and means to provide part of the hydrogen from one of the at least one hydrogen outputs to the hydrogen-fuelled generator, wherein the hydrogen-fuelled generator is adapted to generate an electrical output; and means to provide the electrical output of the hydrogen-fuelled generator to the electrical input of the hydrocarbon pyrolysis reactor.

Using this approach, the hydrogen production system can be effectively self-sustaining in use, only requiring electrical energy on start up. Using the approach, if more hydrogen is passed through the hydrogen-fuelled generator, surplus electricity may also be produced for other uses. Both features may be particularly useful to provide a hydrogen production system for use in a specific environment—for example, for running a hydrogen-based heating system, or in a location where there is a hydrocarbon gas present but may not be a consistent electrical supply (for example, in an oil field where flare gas is available). In embodiments, the hydrogen-fuelled generator may be a fuel cell, such as a solid oxide fuel cell. In other embodiments, the hydrogen-fuelled generator may comprise a hydrogen-fuelled motor, or a hydrogen-fuelled gas turbine.

In embodiments, the hydrocarbon pyrolysis reactor may have a first, high purity, hydrogen output and a second, lower purity, hydrogen output. These outputs may be provided by a hydrogen purification stage to provide the first hydrogen output and the second hydrogen output. Such a hydrogen purification stage may comprise a pressure swing adsorption stage. Using this approach, a part of the second hydrogen output may be provided as fuel for the hydrogen-fuelled generator. Another part of the second hydrogen output may be provided as purge gas for the hydrogen pyrolysis reactor. In one embodiment, the first hydrogen output may be at substantially seven nines purity and the second hydrogen output at substantially 1.5 nines purity. If a hydrogen purification stage is used, this may be configured to provide high and lower purity hydrogen according to use requirements for each hydrogen stream.

The hydrogen production system may also comprise a heat exchanger-hydrogen output by the hydrogen production system may pass through the hydrogen purification stage before or after it passes through the heat exchanger, depending on preferred design choice.

The hydrocarbon pyrolysis reactor may comprise a plasma torch. In embodiments, it may also comprise a liquid metal system after the plasma torch for pyrolysis of hydrocarbons and separation of reaction products. Alternatively, it may employ a gas purge system for separation of reaction products.

The hydrocarbon input may be a methane input. The hydrocarbon input may be adapted to receive flare gas.

In a second aspect, the invention provides a method of operating a hydrogen production system, comprising: activating a hydrocarbon pyrolysis reactor using a hydrocarbon input and an electrical input; providing at least one hydrogen output from the hydrogen production system, and providing hydrogen from one of the at least one hydrogen outputs to a hydrogen-fuelled generator; generating electrical power at the hydrogen-fuelled generator, and providing electrical power from the hydrogen-fuelled generator to the electrical input to the hydrogen pyrolysis reactor.

Providing at least one hydrogen output may comprise providing a first, high purity, hydrogen output and a second, lower purity, hydrogen output. This first hydrogen output and second hydrogen output may be provided by a hydrogen purification stage, which may be a pressure swing adsorption stage. Part of the second hydrogen output may be provided as fuel for the hydrogen-fuelled generator, with another part of the second hydrogen output provided as purge gas for the hydrogen pyrolysis reactor.

The hydrocarbon pyrolysis reactor may comprise a plasma torch, and providing electrical power from the hydrogen-fuelled generator may comprise powering the plasma torch.

The hydrocarbon input may be a methane input. The hydrocarbon input may be adapted to receive flare gas.

BRIEF DESCRIPTION OF FIGURES

Embodiments of the invention will now be described, by way of example, with reference to the accompanying Figures, of which.

DESCRIPTION OF SPECIFIC EMBODIMENTS

General and specific embodiments of the invention will be described below with reference to the Figures.

Figure 1:
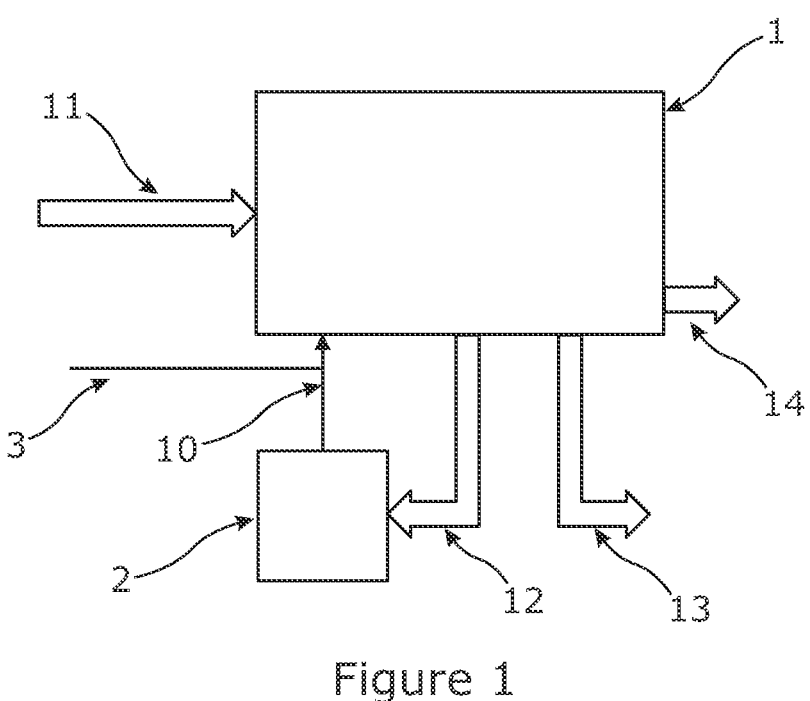
FIG. 1 shows a hydrogen production system according to an embodiment of the invention.

FIG. 1 shows an exemplary hydrogen production system according to an embodiment of the invention. A reactor 1 receives as a feed gas a hydrocarbon input 11, the reactor having an electrical power input which may be provided by an electrical power source 3. The reactor may be a plasma torch reactor of a design discussed further below. The reactor produces hydrogen as an output—in the arrangement shown, this comprises a high purity hydrogen output 13 and a lower purity hydrogen output 12. Other outputs 14 from the reactor process may include carbon, for example, if methane is used as the feed gas.

At least a part of the hydrogen output—in the case shown, this is all of the lower purity hydrogen output 12, though in other embodiments some of this hydrogen may be recirculated back into the reactor 1—is provided as input to a hydrogen-fuelled generator 2. This may comprise a hydrogen-fuelled motor, a hydrogen-fuelled gas turbine, or a fuel cell (such as a solid oxide fuel cell (SOFC)). The electrical output 10 from the hydrogen-fuelled generator may be directed back to the reactor 1 and used to power the operation of the reactor 1 itself-alternatively, a larger proportion of the hydrogen output could be routed back through the hydrogen-fuelled generator 2, which could provide additional electrical output for other purposes. In this way, when in operation, the reactor may operate without acting as a significant electrical power consumer for most of its operating cycle.

Figure 2:
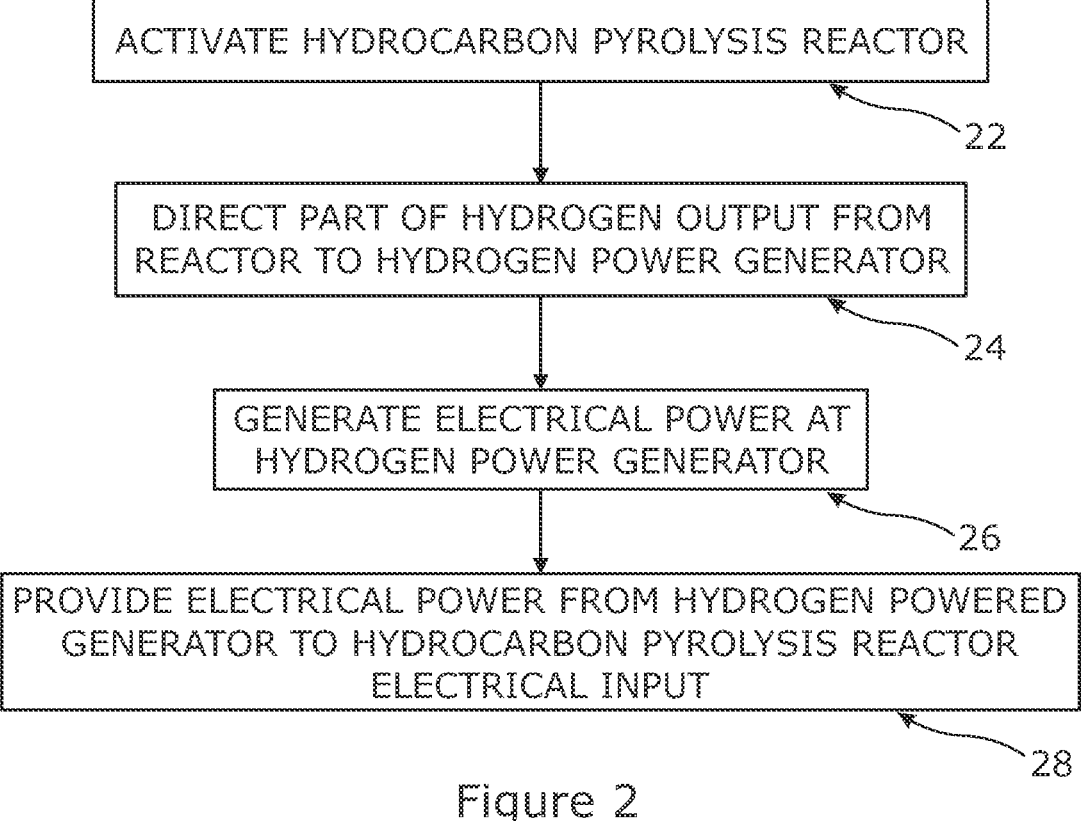
FIG. 2 shows a method of operating a hydrogen production system according to an embodiment of the invention.

In method terms, this is shown in FIG. 2. First of all the hydrocarbon pyrolysis reactor is activated 22—this requires an input of hydrocarbon feedstock and also electrical power to bring the reactor into operation (for example, to energise the plasma torch of a plasma torch reactor). This will require either access to mains power, or to a dedicated local system (for example, a battery or generator) to provide the power required. In operation, a part of the hydrogen output is directed 24 from the reactor to the hydrogen-fuelled generator. The hydrogen-fuelled generator uses the hydrogen as a fuel source and generates 26 electrical power which is then directed to provide the electrical energy input 28 to the reactor. This means that in normal running, the reactor is self-sufficient for power.

As noted above, the reactor 1 is adapted to receive a hydrocarbon input—in particular embodiments, this hydrocarbon input may be primarily methane. A natural gas input comprises primarily methane, possibly with small quantities of other short-chain hydrocarbons which for a pyrolysis reactor (as described in embodiments below) will pyrolyse in a similar way. In embodiments, other gas inputs dominantly comprising hydrocarbons may be used—of particular interest is "flare gas", which is a general term for gaseous hydrocarbon found along with liquid hydrocarbons ("oil"). Flare gas also largely comprises methane, but will typically also contain short-chain carbons and may comprise other compounds such as water vapour, hydrogen sulphide ($H_2S$) and carbon diox ($CO_2$), and nitrogen ($N_2$) Depending on the type of reactor, some of these may be included in the input and pyrolyzed or otherwise reacted with reaction products separated out downstream, whereas others may be separated from the flare gas in one or more separation stages before admission to the reactor. For example, a desulphurisation step may be carried out before admission of flare gas.

A particularly suitable embodiment of a hydrogen production system will now be described—this approach uses a plasma torch to separate methane into hydrogen and carbon. The embodiment described in detail below also comprises a liquid metal system to remove the hydrogen and carbon for separation into a hydrogen gas output and a solid carbon output. Other embodiments of the invention do not use a liquid metal system, and employ other approaches for separation—for example, in other embodiments a purge gas such as nitrogen is used to carry away the torch outputs of hydrogen and carbon, and one or more cyclones are then used downstream to separate out the carbon.

The elements and operating principles of such a hydrogen production system will be described with reference to FIGS. 3 to 11. A reactor using this approach will first be described. The reactor is formed as a pressure vessel with electrical inputs to power a plasma torch or torches (further detail is provided in FIG. 8) and gas inputs for gaseous feedstocks to be admitted to the system. An exemplary reactor shown here has multiple stages—the plasma torches act as one reactor stage, with the liquid metal potentially acting as a further reactor stage consuming heat generated by the plasma torches. The reaction products include heated gas—hydrogen in the main example discussed below—and a heat exchanger may use the heated gas to bring feedstock gases to the correct temperature for reaction, effectively acting as a preliminary reactor stage. In other embodiments, there is a single reactor stage and a gas purge instead of a liquid metal system.

In the multi-stage reactor approach, gaseous inputs—for example, hydrocarbons such as methane, and potentially additional hydrogen for cooling (though this may be recirculated from the output products)—are admitted into the plasma torch, and the plasma torch consumes the input feedstock gases providing a first set of output products, such as carbon and hydrogen. These first output products pass at high temperature as inputs into a liquid metal reactor, which then provides pyrolysis of further feedstock gas. Final output products—such as carbon, extracted through the liquid metal, and hydrogen, output as a gas—are provided from liquid metal reactor after a separation process—these final output products include the first output products from the plasma torch along with further output products produced from pyrolysis in the liquid metal reactor. The pyrolysis reaction is endothermic, but there is still sufficient heat present that the gaseous final output products are at significantly greater temperature than desired for storage, so there is excess heat to be used. Here, this heated gas output is used by a heat exchanger which controls the temperature of feedstock gases for different stages of the reactor process. As has been noted above and will be noted further below, this multi-stage reactor is only an exemplary hydrogen production system-embodiments of the invention do not require all the features described for the multi-stage reactor.

Figure 3:
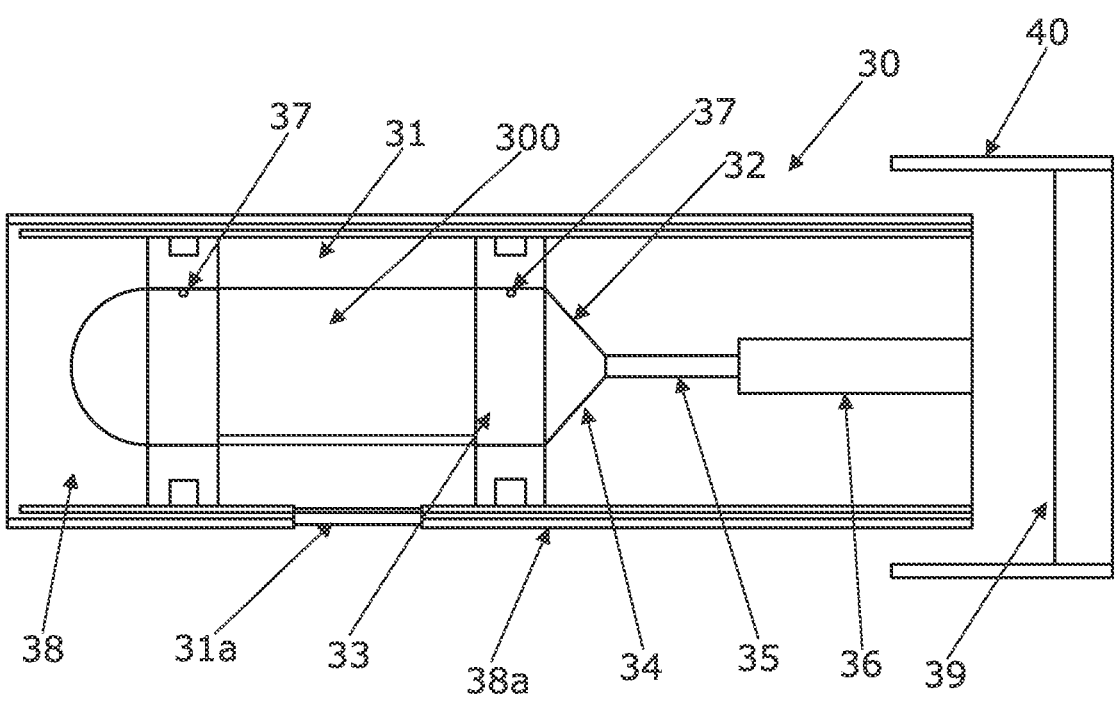
FIG. 3 shows a longitudinal cross-section of a plasma torch from an exemplary hydrogen production system.
Figure 4:
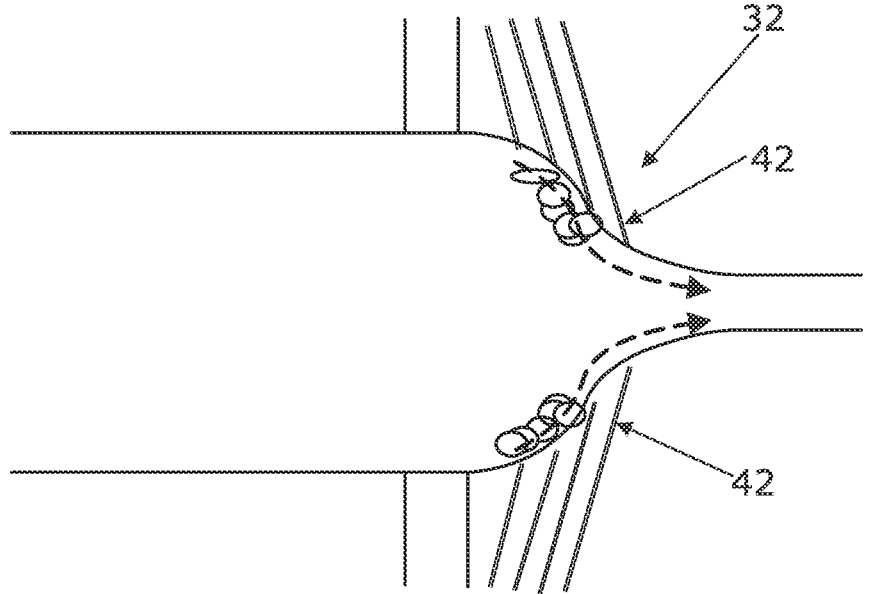
FIG. 4 show a detail from the plasma torch of FIG. 3 showing additional elements of the anode, and illustrating features that prevent carbon build-up.
Figure 5:
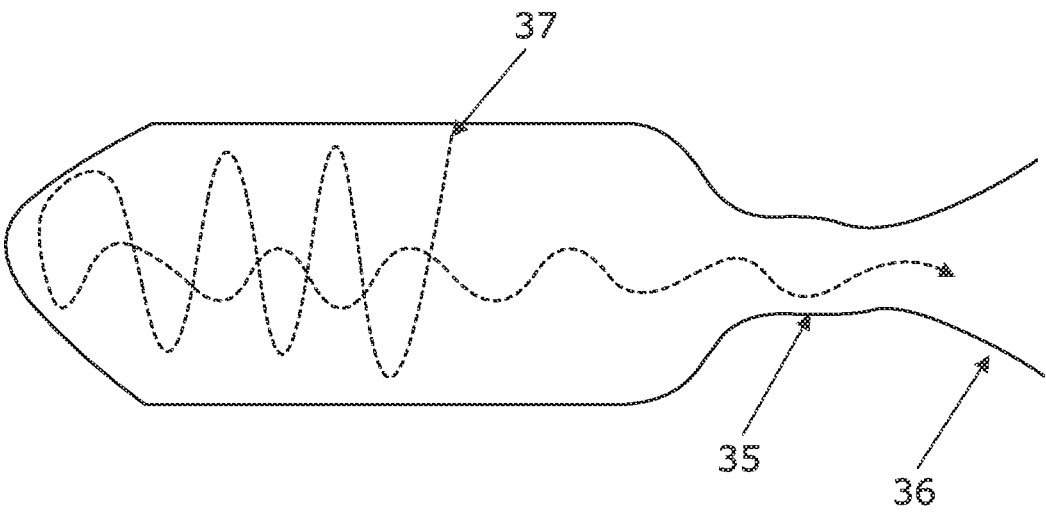
FIG. 5 shows flow of reaction gases through the plasma torch of FIG. 3.
Figure 6A:
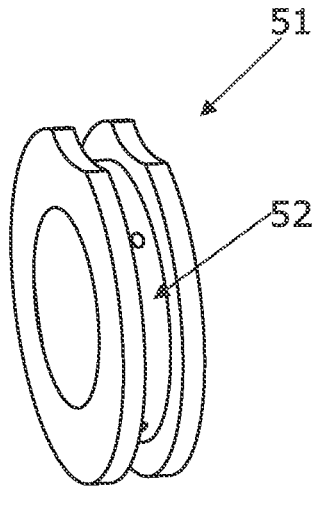
FIGS. 6A and 6B show side elevation and sectional views respectively of a ring for inlet of feedstock gases for use in the plasma torch of FIG. 3.
Figure 6B:
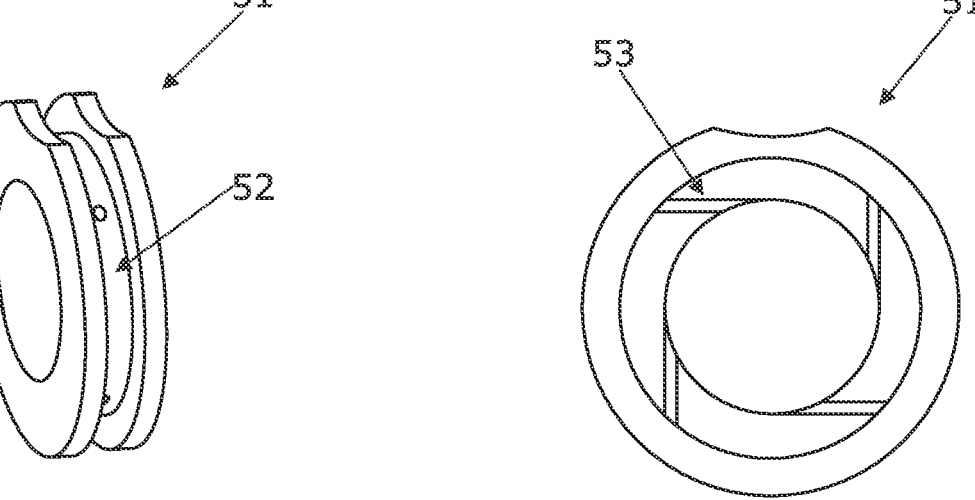

The plasma torch is shown in more detail in FIGS. 3 to 5. A longitudinal sectional view of the plasma torch 30 is provided in FIG. 3. The plasma torch 30 is generally cylindrical, and in the arrangement used in embodiments of the invention, it extends into a liquid metal circulation system 40 (discussed further below) where it jets directly into the liquid metal. The plasma torch has a central chamber 300 containing a cathode 31 and an anode 32. These may be of any conductive material suitable for the conditions in the central chamber 300—carbon (graphite) could be used, or any suitable metal or alloy, either uniform or with suitable inserts—for example, copper with hafnium inserts would be a possible choice. Here, the cathode 31 is located towards the end of the plasma torch 30 remote from the liquid metal reactor 39, with a ceramic cup-shaped end section 38 here terminating the plasma torch. In alternative torch designs, the electrodes may be disposed the other way around, or an alternating current plasma torch may be used in which it is only meaningful to talk of electrodes, rather than anode and cathode. The anode is generally cylindrical, but it has a shaped inner surface 34 which comprises a nozzle 35 and a diffusing section 36, which will be described in greater detail below. A protective electrode 33 may be disposed between the cathode 31 and the anode 32—the skilled person will appreciate that again the electrode structure may be varied to achieve a desired field pattern within the plasma torch chamber, and may involve none, one or multiple intermediate electrodes-multiple protective electrodes may be cascaded to help stabilisation of the spark, for effective ignition, or to prevent wear on the anode. Gas inputs 37 are provided to admit gaseous feedstock into the reactor—in the arrangement shown in FIG. 3, methane is admitted in the gas input 37 disposed in the protective electrode 33. As will be indicated in further detail below, different gas input positions are provided for different feedstock gases in different embodiments of the invention. While the discussion below will refer primarily to methane, it should be appreciated that other hydrocarbons may equally well be used—for example, propane can be transported in liquid form but will vaporise easily for reaction in a plasma torch reactor, so will be another particularly suitable choice for processing.

FIG. 4 illustrates one phenomenon in the use of the plasma torch 30 shown in FIG. 3 to break down methane. In this reaction, methane decomposes at high temperature into hydrogen gas and carbon through action of the plasma torch spark, which may have a temperature of 6000 degrees Centigrade, resulting in instant decomposition. A practical issue is that this may result in carbon deposits 41 which would clog the torch, which will significantly affect the efficiency of the process, and which could lead to significant downtime for maintenance. It would be desirable to prevent such carbon build up, and for both reaction products to exit the plasma torch 30. One feature to achieve this is to protect the anode with a gas that will inhibit build up. This can be achieved by making the anode 32 porous, with anode gas outputs 42 delivering gas—in this case, hydrogen, through the anode to provide a protective curtain along the inside of the anode, inhibiting carbon build up. The gas is delivered at an angle to the anode such that it has a component of velocity towards the plasma torch output to achieve this protective curtain-alternatively, a component of velocity can be provided away from the plasma torch output, as this will still provide a protective curtain to the electrode. In addition to providing a protective curtain, there may also be active erosion of deposited carbon by the hydrogen—the hydrogen can react with the carbon in a back reaction back to methane, thus further eroding any carbon deposited. The hydrogen also serves to cool the anode, preventing it from being degraded. In addition to using a porous anode in this way, the cathode can also be made porous and cooled in a similar way.

Further strategies are used to prevent carbon build-up. The shaping of the anode can also be arranged such that a likely deposition point for carbon would be on the anode in the region of the spark gap with the torch in operation-spark action can then further erode any carbon build-up.

Another feature that prevents carbon build up is shown in FIG. 5, which illustrates the passage of gas through the plasma torch structure. Here, methane enters the plasma torch tangentially through the gas input 37 in the protective electrode, and this input methane travels towards the cathode following a generally helical path. The gas input 37 here is provided through a ceramic ring 51, shown in more detail in FIGS. 6*a* and 6*b*. In alternative arrangements, the ring could be metal, and could be formed as part of the cathode and/or the anode—a variety of arrangements are possible that enable and sustain the flow arrangement described here. The ceramic ring 51 has a gallery 52 for circulation of the input gas around the ring, allowing the input gas to pass into a number (four in the design shown) of channels 53 which deliver input gas tangentially into the chamber, establishing both a helical path in the output gas adjacent to the wall of the chamber and also a vortex within the plasma torch chamber. This may be optimised taking into account gas type, flow conditions, pressure and temperature to achieve the desired flow pattern. The wall structure (in particular wall roughness and geometry promotes the outer helix of gas maintaining its momentum and separating from the faster rotating inner helix of gas, with the torch geometry forcing the gas into an inner returning helix at a greater speed and with a tighter inner circle. The gas adopts this tighter helix on travelling back between cathode and anode, and it maintains this on heating as it is broken down into carbon and hydrogen in the spark gap between the cathode and the anode. Plasma formation is rapid—it will typically take less than a microsecond. For a gas, proper tuning allows this to be tuned (by pressure, temperature and density) to minimise exchange of energy between the helices, similarly to a tornado. This configuration already gives the output gas—in this case, hydrogen-significant velocity towards the output of the plasma torch, and it will also prevent carbon condensation and deposition, as the carbon is formed in the centre of the plasma torch chamber rather than at the walls. The plasma comprises ions and electrons in energetic balance in a state of near thermal equilibrium, with molecules largely decomposed into atoms-under operating conditions of temperature and pressure in the plasma torch, the stable state of carbon on condensation from plasma is gaseous, reducing likelihood of carbon deposition. The plasma torch design is generally arranged so as to promote the reaction in the centre of the chamber and to inhibit it at the walls, so that the reaction products are preferentially driven out of the plasma torch into the liquid metal reactor. The outer helix cools and insulates the wall, while preventing atomic carbon in the inner helix from condensing on the walls. The hydrogen from the reaction passes through the nozzle 35, which results in an increase in speed and a decrease of pressure according to the Venturi effect. The gas is then output from the plasma torch 30 through the diffuser 36 with high temperature (and kinetic energy)—the plasma is ejected from the torch at supersonic speeds. By the cumulative effect of these features, carbon is generally carried through into the plasma torch output without significant build-up of deposit on the walls of the anode. The role of the diffuser 36 is to match the pressure of the output of the plasma torch with the next reactor stage, as will be described in more detail below. As noted here, the embodiment described in detail here, the next reactor stage is a liquid metal reactor—the liquid metal here may also be used to interact directly with the torch, as will also be discussed further below.

This arrangement allows for operation at high temperature (above 6000 degrees Centigrade at the point of reaction) and hyperbaric pressure in the torch, with a very high throughput of gaseous feedstock. For an input of 200 kW of power into the plasma torch, and with operating temperatures within the torch chamber in the region of 6000 degrees Centigrade at the point of reaction and pressures of 50 bar, approximately 72 kg/hour of methane can be processed using this design. The voltage across the electrodes will typically be between 150V and 600V, typically about 250V, with operating current between 100 A and 500 A, typically about 200 A. Feedstock gases can be pre-heated by using a heat exchanger-taking advantage of the heat given out in the pyrolysis reaction (see further discussion below), though hydrogen used to cool the anode will be provided at a lower temperature.

An overall reaction flow for a multi-stage reactor will be described with respect to FIG. 7. As previously noted, this is only one exemplary reactor type that may be used in embodiments of the invention—in other embodiments, the plasma torch may be the only reactor, and may be followed by a gas purge and separation stages. This reaction flow is specific to decomposition and pyrolysis of methane, but it is used here more generally to illustrate the different reaction processes taking place in different parts of the composite reactor. For example, other hydrocarbons such as propane may be used as a feedstock hydrocarbon, rather than methane, in not only the plasma torch reactor but also the liquid metal reactor.

Two inputs to the system are shown: electricity 1101 and hydrocarbon 1102 (in this case, methane). Two outputs are shown: hydrogen 1103 (though for other reactions, other output gases may be provided as well or instead-note also that some of the hydrogen generated is recirculated for use in the reaction processes) and carbon black 1104. These outputs are put to different uses, as will be indicated further below with reference to FIG. 12. Both inputs are provided to the plasma torch 1105—in addition to electrical power and the hydrocarbon feedstock, hydrogen is provided as an input. In the arrangement shown, a low temperature hydrogen input 1111 (shown here in the 200-400 degree Centigrade range) is provided to the plasma torch 1105 for cooling the anode, for example, with high temperature hydrocarbon 1112 (shown here at around 700 degrees centigrade), used as a reaction feedstock and also to maintain the temperature and pressure of the reaction chamber and to promote the flow of material through the plasma torch. As the plasma torch consumes electrical energy and generates a high temperature output, this is partially consumed by the pyrolysis reaction in a second reactor 1122, from which heated output gases can be used in a heat exchanger 1121 to circulate the hydrocarbon feedstock so that it is elevated from low temperature hydrocarbon 1113 at about 200 degrees Centigrade to high temperature hydrocarbon 1112 at a plasma torch reaction temperature of about 700 degrees centigrade—the heat exchanger 1121 can also provide hydrogen at cooler temperatures to the plasma torch. This heat exchanger 1121 thus effectively acts as a first reactor process, absorbing the heat of the end process and using it to bring gases required for reaction stages to the correct temperature.

The plasma torch 1105 itself acts as a second reactor 1122, providing high temperature hydrogen and (primarily) gasified carbon as outputs 1114. The plasma torch 1105 through its reaction products operates on the next reactor stage, which is a liquid metal pyrolysis reactor 1123. The plasma torch 1105 provides heat for this reaction, heating up the metal (here, lead) to reaction temperature, and also providing rotation to the lead, allowing the carbon to be extracted at the centre of the reactor. More high temperature hydrocarbon 1115 is provided from the heat exchanger 1121 as a feedstock for the liquid metal pyrolysis reactor 1123. The hydrogen output 1116, provided at very high temperature (approximately 1200 degrees Centigrade) from the excess heat produced in the thermal electrolysis reaction in the pyrolysis reactor, is returned to the heat exchanger 1121 and partly recirculated to the plasma torch 1105 while mainly provided (at a lower temperature) at the hydrogen gas output 1104.

Figure 8:
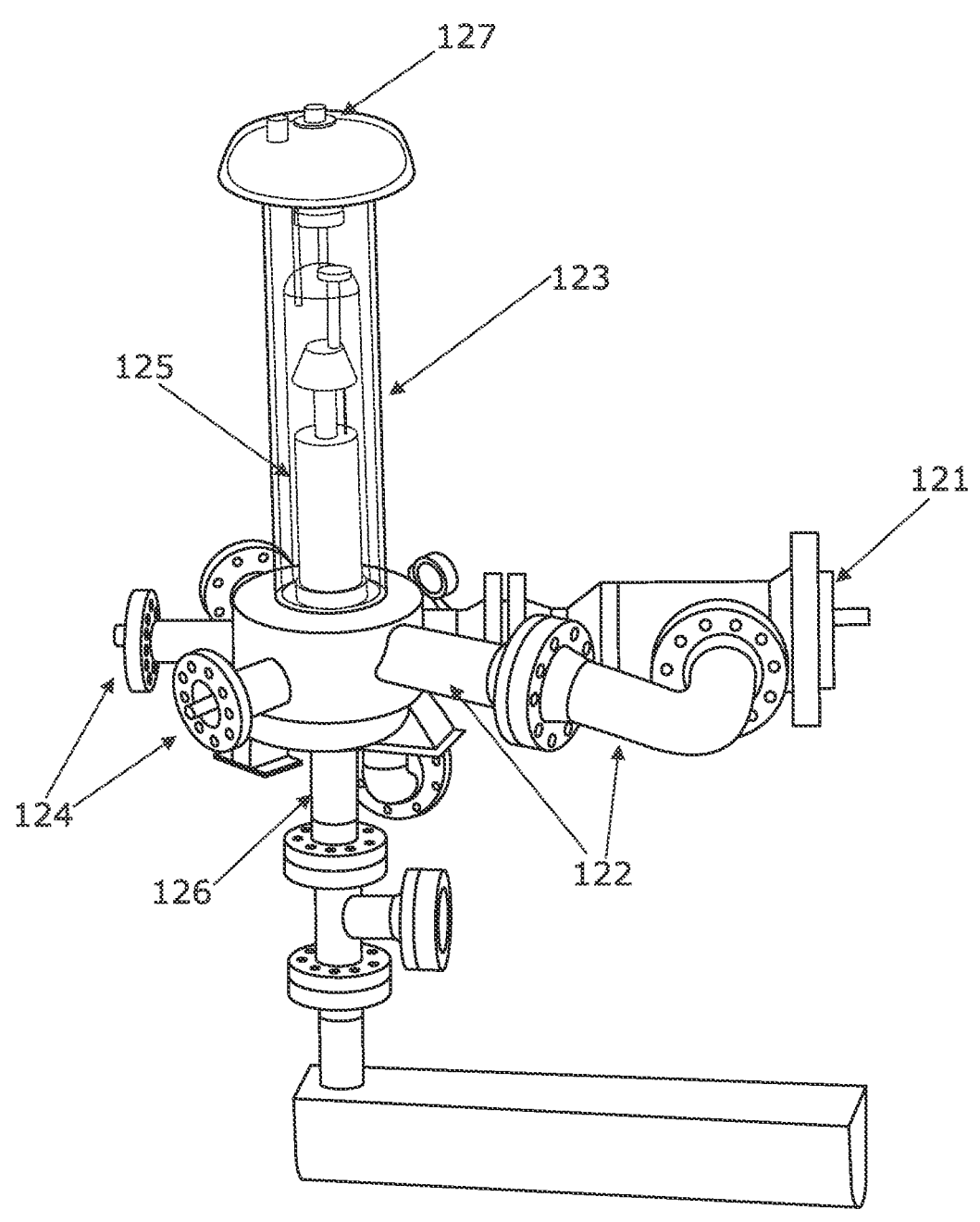
FIG. 8 illustrates a liquid metal pyrolysis reactor system driven by the plasma torch system of FIGS. 3 to 7 and including a housing for the plasma torch system.

The liquid metal pyrolysis reactor used in certain embodiments of the invention is shown in more detail in FIGS. 8 to 11. FIG. 8 illustrates the main elements of the reactor assembly. The torch mounting 121 is directed into a liquid metal racetrack 122 which feeds into the main reactor volume 123. There are also gas inputs 124 to the main reactor volume 123, which contains a swirl chamber 125. The liquid (molten) metal is delivered into the swirl chamber 125 so as to give rotation to the liquid metal column, allowing the liquid metal both to initiate a pyrolysis reaction in the input gas and to act as a centrifugal separator, separating reaction products towards the centre of the rotating column. Carbon is then extractable from the base of the reactor in a carbon output 126. Hydrogen rises from the liquid metal and is released through a hydrogen output 127 from the top of the reactor. The reaction is carried out at elevated temperature and pressure (typically 800-1000 degrees Centigrade and 50 bar).

This functionality may be usefully combined with that of the plasma torch even if the liquid metal system is not itself a reactor—in that case, it may only act as a separator to separate the reaction products from the plasma torch, powered by the energy of the plasma torch output. This leaves significant excess heat, however, and it is found that making the liquid metal system itself a reactor, used for endothermic pyrolysis of further hydrocarbon, leads to a particularly effective reactor system.

Figure 9A:
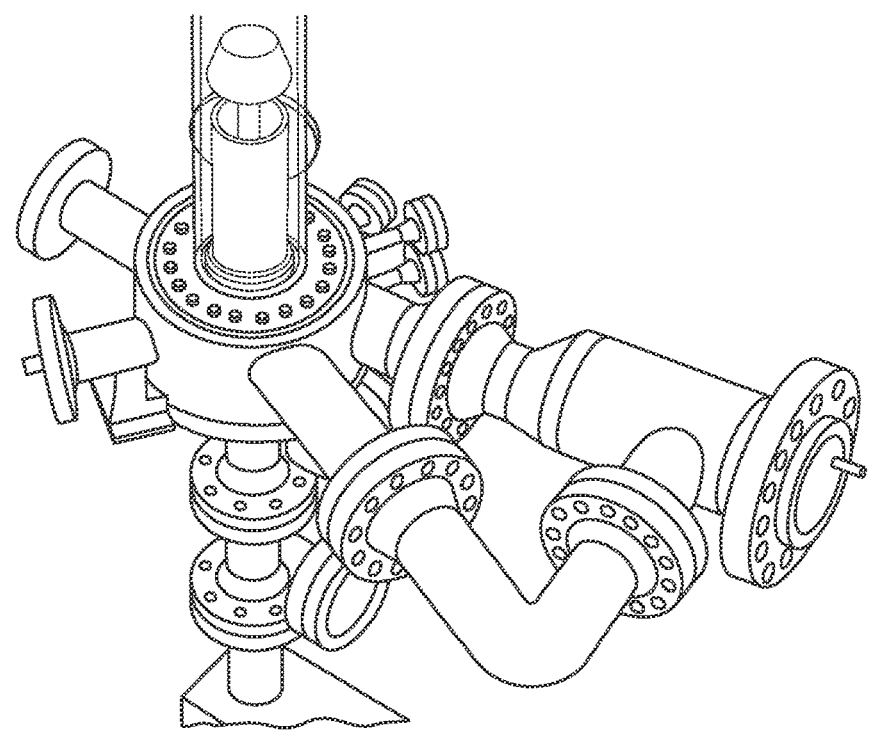
FIGS. 9A and 9B illustrate the liquid metal circulation system of the reactor of FIG. 8 driven by the plasma torch.
Figure 9B:
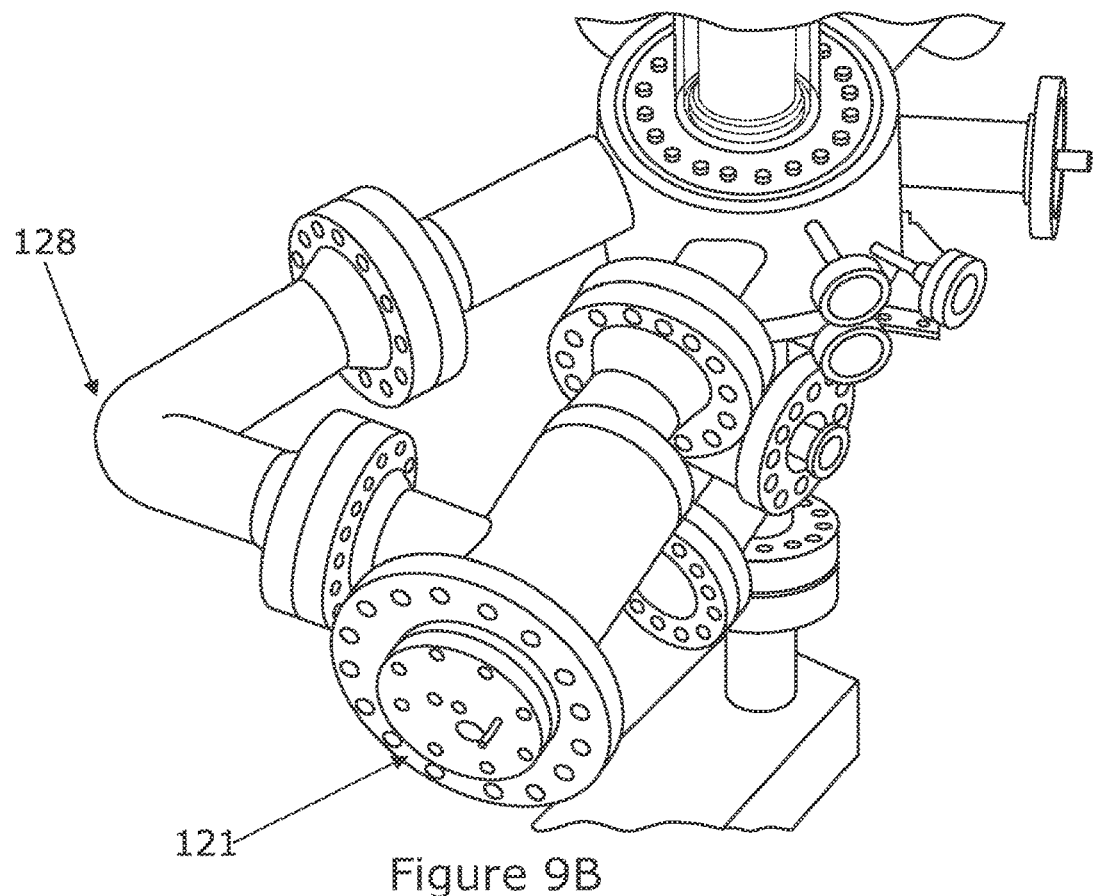

FIGS. 9A and 9B show the plasma torch mounting and the liquid metal racetrack from different angles. Liquid metal passes out of the reaction chamber as it cools and reaction products are separated, and it then passes through a liquid metal racetrack 122 past an elbow joint 128 towards the plasma torch mounting 121, where the plasma torch output is jetted into the liquid metal. This heats the liquid metal up to a sufficient temperature to initiate a pyrolysis reaction in hydrocarbons such as methane, and also carries the reaction products of the plasma torch reaction into the liquid metal reactor so that they can be collected from the system (methane passing into the liquid metal from the plasma torch jet may also be pyrolyzed at this point). The heated metal passes along the rest of the liquid metal racetrack and enters the liquid metal reactor chamber from the bottom. The parts of the racetrack structure as a result need to withstand high temperatures from the heated liquid metal, and they will also need to be adapted for expansion from the significant difference between temperatures during reaction processes and outside reaction processes. Joints may for example be protected by use of molybdenum sleeves.

The plasma torch is designed so that it will jet effectively into the liquid metal racetrack 122—in particular, the diffuser of the plasma torch is designed to match pressures with the outside of the torch. This will have the benefit of supporting linear rather than turbulent flow in the liquid metal racetrack. The liquid metal may be brought into a swirl or vortex which will act to stabilize the plasma jet. Reaction products from the plasma torch—in the example shown, hydrogen and carbon—will be carried in the liquid metal for subsequent separation in and output from the liquid metal reactor, as described below.

The liquid metal system may also serve to purge the outputs of the plasma torch reactor from impurities. For example, ethylene may be produced as a by-product but then be broken down again in the liquid metal system. The liquid metal from the liquid metal system may have other functions. For example, the diffuser of the plasma torch may extend sufficiently far into the liquid metal racetrack that the liquid metal will act to clean the diffuser and prevent carbon build-up there—in embodiments, the diffuser section may be porous in part to support liquid metal flow. If desired, the liquid metal from the racetrack could even be driven up to flood the plasma torches, rapidly quenching the reaction and stopping their operation. Liquid metal could thus be used to flood—and hence clean—the porous anode (and where used, cathode) structures.

A low melting point element like lead, or a low melting point mixture primarily containing lead, may be used as the liquid metal in the liquid metal system. Lead is a suitable choice as it is liquid at reaction temperatures without having a high vapour pressure, and it creates fewer toxicity issues than most other suitable metals. Gallium is another possible choice. Other low melting point alloys, such as Bismuth-Tin, are also suitable choices.

Figure 10:
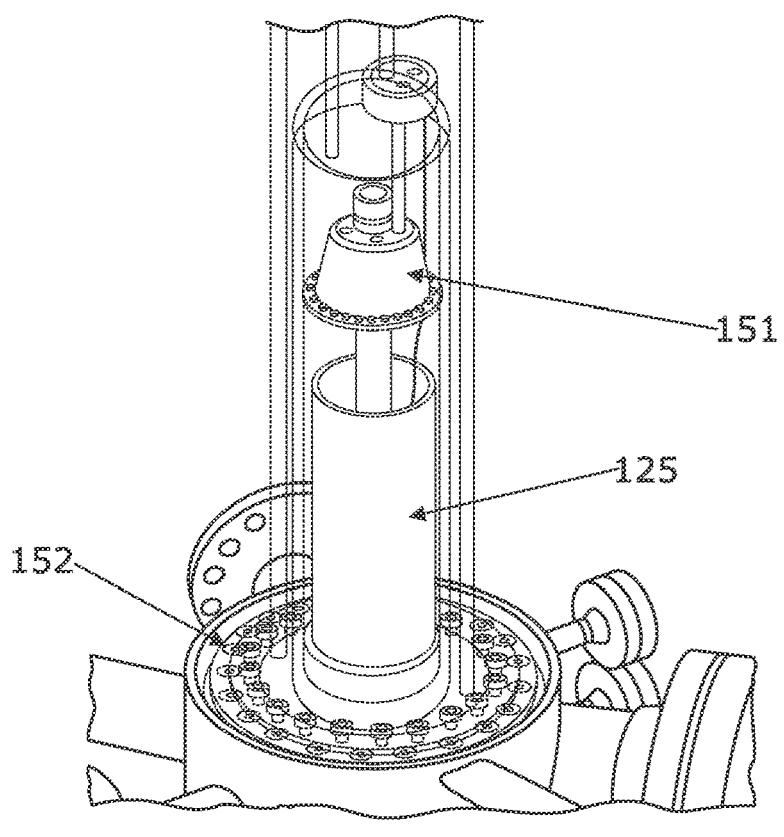
FIG. 10 illustrates the liquid metal pyrolysis reactor of FIG. 8 in more detail.

As noted above, the liquid metal system is here designed in this structure to act as a separator but it can also act as a reactor. FIG. 10 provides a view of the swirl chamber 125 which forms the reaction chamber for the liquid metal pyrolysis reactor. Heated liquid metal is passed into this chamber from below along with input gases, and circulation within the swirl chamber 125 leads to separation with the reaction products separated by centrifugal action into the centre of a circulating liquid metal column, with carbon and hydrogen initially collected in a hat structure 151 at the top of the reactor. This can be used to collect clean hydrogen—this will be the only gas at this point and can simply be released through a float valve. A liquid salt structure can be provided in this structure for the lead and carbon mixture to percolate through—this will separate out the carbon from the lead, with the process being completed by gravity with the lighter carbon floating up over both the lead and the salt, which are heavier. This enables the carbon to be separated by dropping it through a chute in the central region of the chamber. The base plate 152 beneath the swirl chamber 125 has through holes for gaseous inputs. Cooling metal passes out through holes in the side of the swirl chamber 125 and down through the base plate 152 where it circulates on to the liquid metal race track shown in FIGS. 13 and 14.

Figure 11:
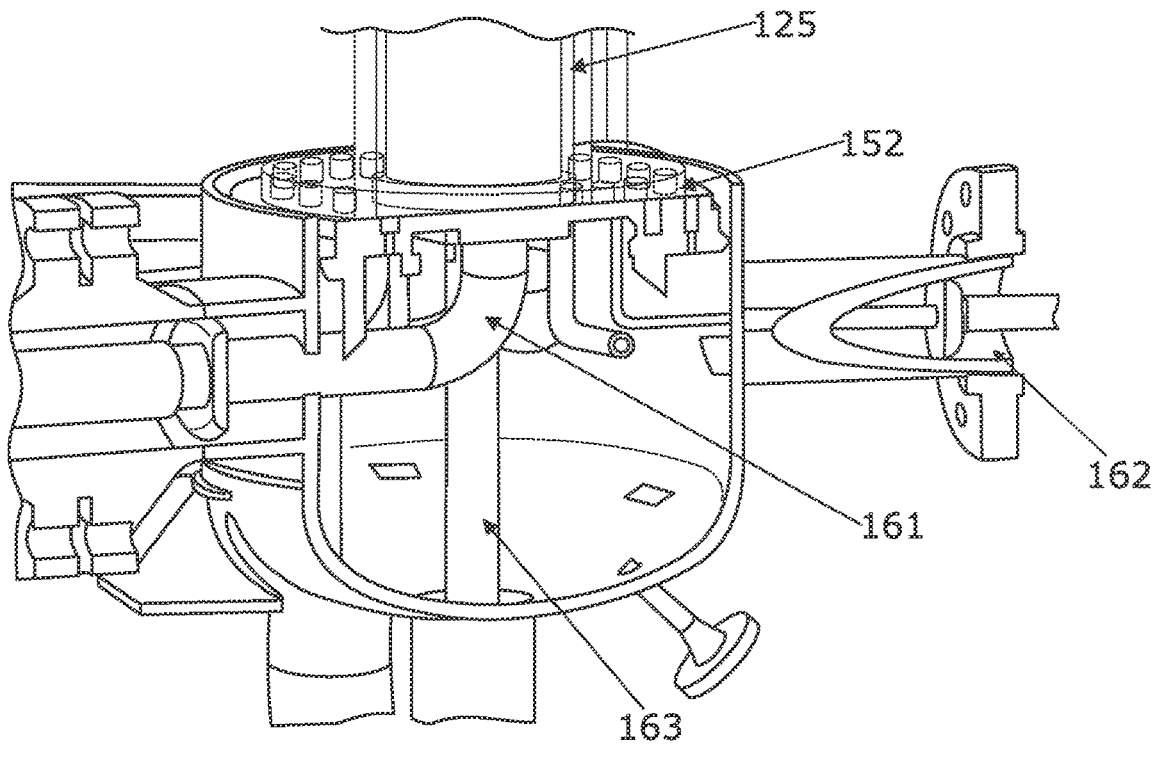
FIG. 11 illustrates feed systems to the liquid metal pyrolysis reactor of FIG. 10, together with a carbon output.

Further details of the swirl chamber 125 are shown in FIG. 11. FIG. 11 shows the lower part of the liquid metal reactor vessel, beneath the swirl chamber 125 in which the reaction takes place. Hot metal heated from the plasma torch enters from below through metal inlet 161 with reaction gases entering through gas inlets 162. Carbon is output through the bottom of the reactor in carbon output 163. Hydrogen is circulated down through the base plate 152 of the swirl chamber 125 for subsequent circulation and collection above the swirl chamber.

As has been described above, a heat exchanger system is provided which allows the heat generated in reaction to be used to provide input gases at the correct temperature for use in the reaction. The hydrogen output from the liquid metal reactor, which is at high temperature (1200 degrees Centigrade) is used to heat up methane feedstock for provision to both the plasma torch and to the liquid metal pyrolysis reactor. A part of this hydrogen output is cooled to a much lower temperature (for example 200 to 400 degrees Centigrade) and used to cool the anode and the cathode of the plasma torch, as described above.

While the reactor embodiment described here is adapted for pyrolysis of methane, this reactor structure can be employed for a number of reactions. As noted in the discussion of the feedstock system, for example, a variety of input gases may be used in different reactions, with input positions of gases chosen to achieve the correct circulation of gases throughout the plasma torch. Similarly, different inputs may be provided to the liquid metal reactor, rather than simply methane, to achieve different reactions.

It should be emphasised that the specific reactor structure described above is exemplary only of a hydrogen production system suitable for use in embodiments of the invention. In particular, a multistage or composite reactor structure is not required-what is needed is an effective way to produce hydrogen and appropriately formed carbon at an appropriate scale, which can be achieved by use of a plasma torch for separation of hydrocarbon into hydrogen and carbon together with a liquid metal system, or other appropriate system, to achieve effective separation.

Figure 7:
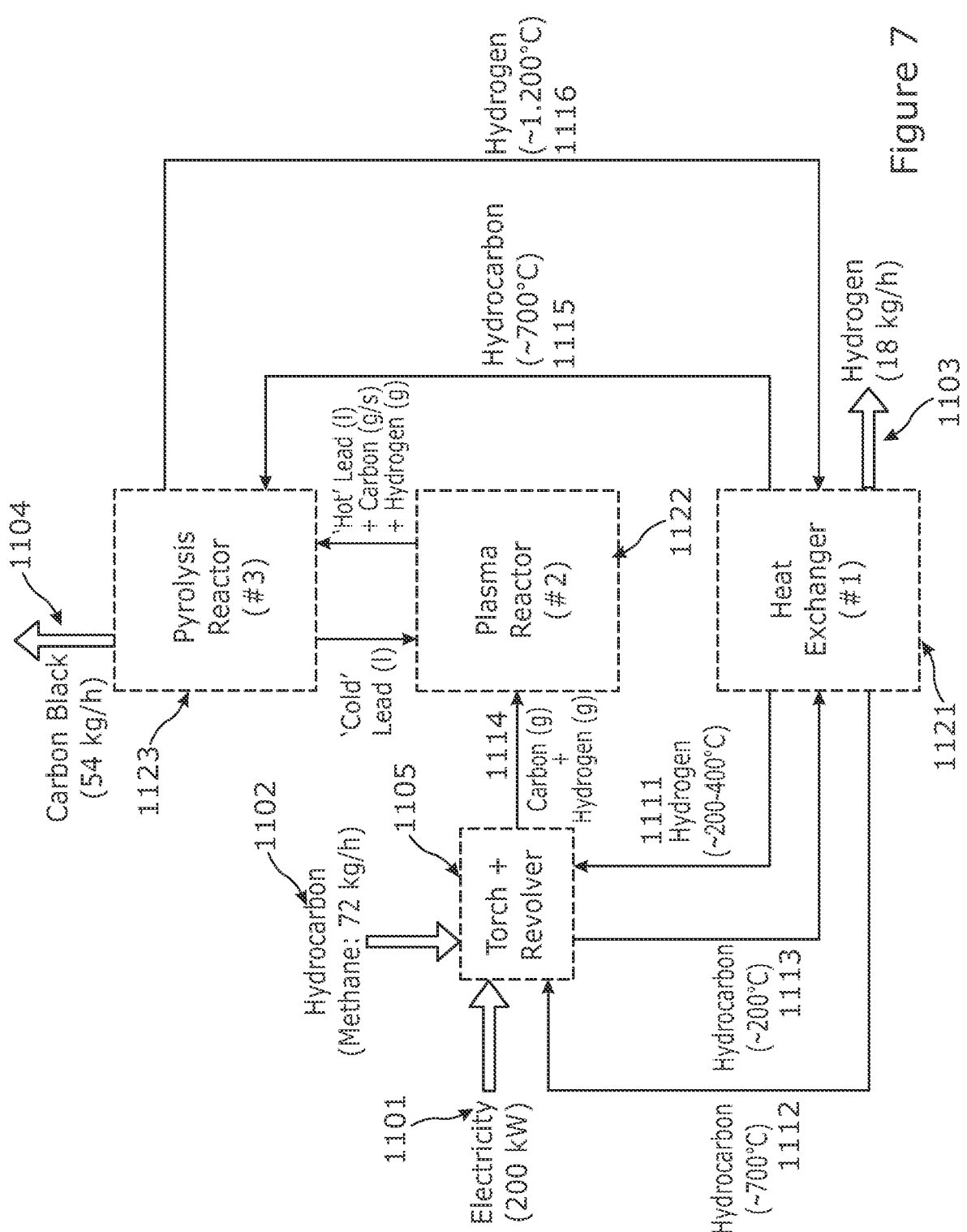
FIG. 7 illustrates a reaction process for a reactor structure suitable for use as a hydrogen production system for embodiments of the invention.
Figure 12:
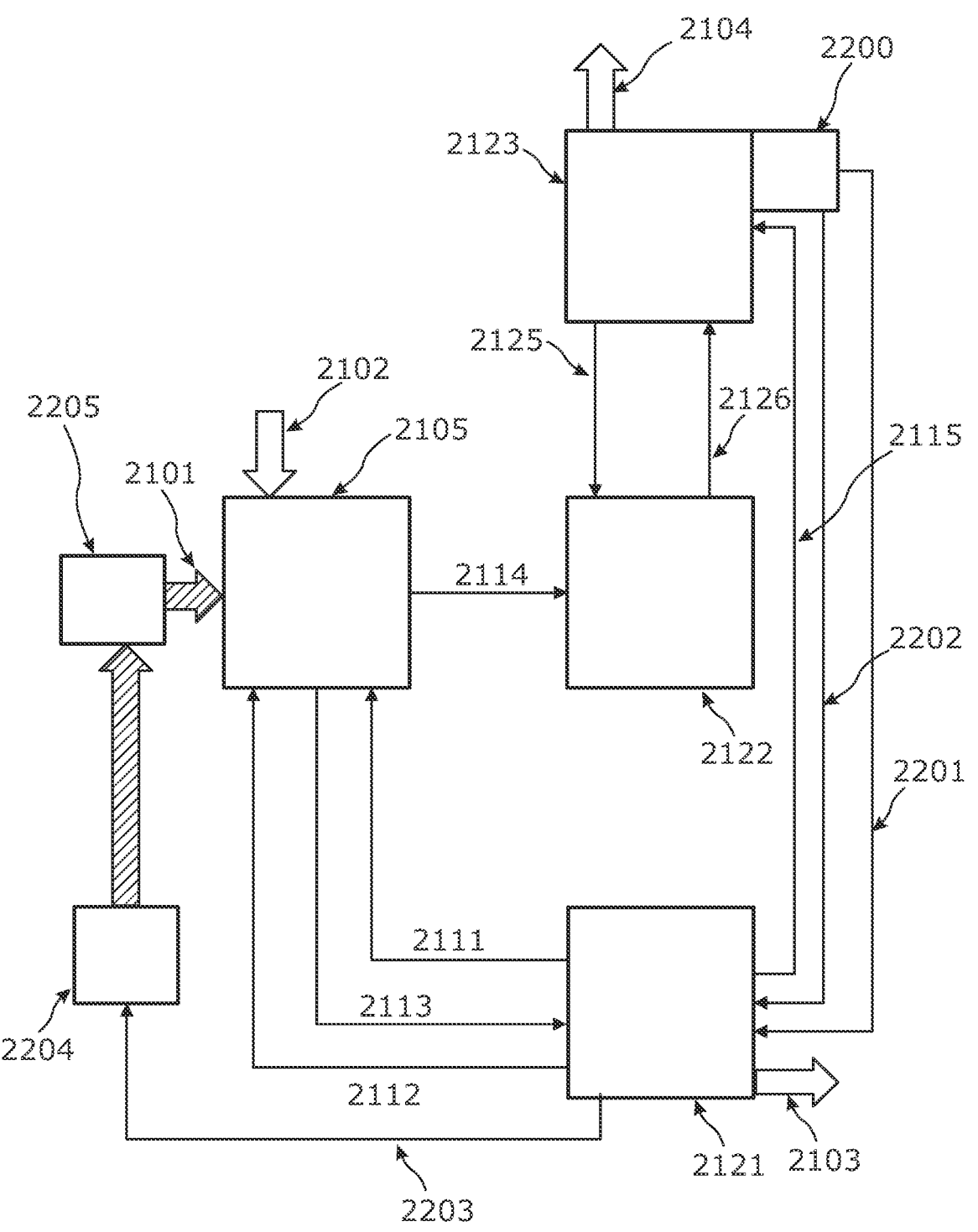
FIG. 12 illustrates schematically a process for operating a hydrogen production system according to an embodiment of the invention using a modified version of the reaction process of FIG. 7.

FIG. 12 illustrates a modified version of the reaction system of FIG. 7 for use in embodiments of the invention. This reaction flow is described for decomposition and pyrolysis of methane, but it is used here more generally to illustrate the different reaction processes taking place in different parts of the composite reactor. For example, other hydrocarbons such as propane may be used as a feedstock hydrocarbon, rather than methane, in not only the plasma torch reactor but also the liquid metal reactor.

Two inputs to the system are shown: electricity 2101 and hydrocarbon 2102 (in this case, methane). The electrical input is provided through an electrical supply system 2205, which as is further described below may provide electrical power from more than one source. Two outputs are shown: hydrogen 2103 (though for other reactions, other output gases may be provided as well or instead—note also that some of the hydrogen generated is recirculated for use in the reaction processes) and carbon black 2104. These outputs will typically be put to different uses-hydrogen primarily as a fuel, whereas carbon black has numerous other applications. Both inputs are provided to the plasma torch 2105—in addition to electrical power and the hydrocarbon feedstock, hydrogen is provided as an input. In the arrangement shown, a low temperature hydrogen input 2111 (shown here in the 200-400 degree Centigrade range) is provided to the plasma torch 2105 for cooling the anode, for example, with high temperature hydrocarbon 2112 (shown here at around 700 degrees centigrade), used as a reaction feedstock and also to maintain the temperature and pressure of the reaction chamber and to promote the flow of material through the plasma torch. As the plasma torch consumes electrical energy and generates a high temperature output, this is partially consumed by the pyrolysis reaction in a second reactor 2122, from which heated output gases can be used in a heat exchanger 2121 to circulate the hydrocarbon feedstock so that it is elevated from low temperature hydrocarbon 2113 at about 200 degrees Centigrade to high temperature hydrocarbon 2112 at a plasma torch reaction temperature of about 700 degrees centigrade—the heat exchanger 1121 can also provide hydrogen at cooler temperatures to the plasma torch. This heat exchanger 1121 thus effectively acts as a first reactor process, absorbing the heat of the end process and using it to bring gases required for reaction stages to the correct temperature. As will be described further below, in this arrangement the heat exchanger 2121 sees multiple hydrogen outputs from the reactor.

The plasma torch 2105 itself acts as a second reactor 2122, providing high temperature hydrogen and (primarily) gasified carbon as outputs 2114. The plasma torch 2105 through its reaction products operates on the next reactor stage, which in this case is a liquid metal pyrolysis reactor 2123—as previously noted, instead of a liquid metal reactor there may be simply a gas purge after the plasma torch and separation stages to separate out carbon and hydrogen. The plasma torch 2105 provides heat for this reaction, heating up the metal (here, lead) to reaction temperature, and also providing rotation to the lead, allowing the carbon to be extracted at the centre of the reactor. More high temperature hydrocarbon 2115 is provided from the heat exchanger 2121 as a feedstock for the liquid metal pyrolysis reactor 2123.

Unlike the FIG. 7 arrangement, here there is a further separation stage 2200 so that hydrogen is output from the liquid metal pyrolysis reactor 2123 (or separation stages) as two output streams—a high purity output 2201 and a lower purity output 2202. The purity of each of these outputs can be determined by extraction, separation and purification processes used, as will be understood by the person skilled in the art—the standard method for purification of hydrogen in industrial processes is pressure swing adsorption. For the reactor process described above, a hydrogen purity of two "nines" (99% purity) could reasonably be expected—the further separation state 2200 may then separate this into a high purity output at seven nines (99.99999% purity) and a lower purity output at 1.5 nines (98.5% purity). This lower purity output may be used as purge gas for the reactor but also to power a fuel cell, as described below. As previously stated, it should be noted that systems other than liquid metal reactors can be used for separation purposes—for example, an appropriate purge gas (such as nitrogen) could be used to remove reaction products away from the plasma torch before separation of hydrogen and pressure swing absorption. In the case of flare gas, while this may be predominantly methane, significant impurities may be present. In the case of a liquid metal system, these may be effectively separated by the liquid metal, but in other cases, additional separation steps (or even removal of certain impurities before use as a feedstock gas to the reactor) may be used.

Both these hydrogen outputs are provided at very high temperature (approximately 1200 degrees Centigrade) from the exothermic reaction in the pyrolysis reactor and are returned to the heat exchanger 2121. Here, the high purity output is provided as the hydrogen output 2103 of the reactor system. The lower purity output is consumed within the reactor system, partly to provide the low temperature hydrogen input 2111 to the plasma torch 2105, but also in a hydrogen fuel cell stream 2203 to a hydrogen-fuelled generator 2204. This lower purity hydrogen can readily be used to power this hydrogen-fuelled generator 2204, which provides electricity to the electrical supply system 2205. In this way, initial electrical power (for example from mains, a battery system, or a generator system) may be required to activate the reactor initially, but during steady state operation the electrical input required to the plasma torch 2105 for it to operate may be provided by the hydrogen-fuelled generator 2204, so that in steady state operation the hydrogen production system is essentially self-sustaining.

Figure 13:
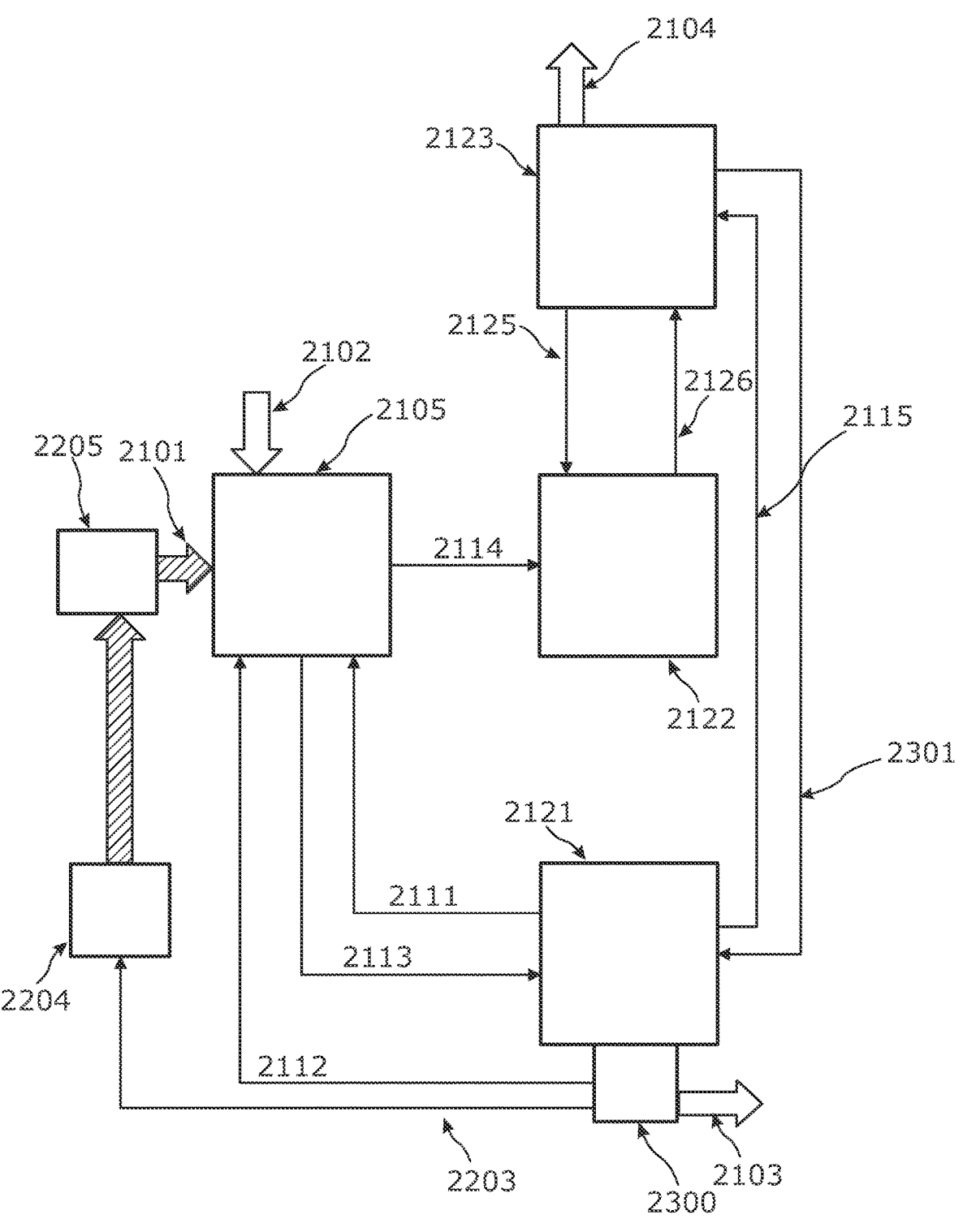
FIG. 13 illustrates an alternative embodiment of a process for operating a hydrogen production system to the process shown in FIG. 12.

In an alternative embodiment shown in FIG. 13, a separation stage 2300 may be located after the heat exchanger 2121 rather than before it—in this case the hydrogen lines may be combined in one line 2301 up to the heat exchanger 2121 and only separated into lower purity and high purity hydrogen by a separation stage 2300 after that. This approach would allow the separation stage 2300 to see lower temperature gases. The outputs from the separation stage would then be provided to the same outputs as are described above for the lower purity and high purity hydrogen streams from the heat exchanger.

The choice of hydrogen-fuelled generator for use in this system is not critical, but it should be determined according to the input fuel available (hydrogen, in the arrangement discussed here, at an appropriate purity level) and the electrical power output required to operate the reactor. One choice is a solid oxide fuel cell (SOFC), though fuel cells with other electrolytes may also be used. A solid oxide fuel cell element comprises a number of stacked layers (predominantly ceramic), and a solid oxide fuel cell will typically comprise a stack of such fuel cell elements connected in series. Solid oxide fuel cells typically have a relatively high operating temperature-between 50° and 1000° C.—but in the proximity of an exothermic reactor this is not difficult to achieve. Alternatively, commercially available hydrogen-fuelled engines and hydrogen-fuelled gas turbines may readily be powered from such a hydrogen supply.

Operating a plasma torch reactor of this type will typically require of the order of 200 KW of electrical power. At typical efficiency for a solid oxide fuel cell, this power output can be achieved by consuming approximately 9 kg/hr of hydrogen at 1.5 nines purity. This is a fraction of the overall hydrogen output (expected to be roughly half of the "low purity" stream), so this is clearly sufficient to enable steady state operation of the reactor without significant provision of external electrical power.

As the skilled person will appreciate, the approach taken here does not rely on the use of a specific type of hydrogen production system, provided that hydrogen and carbon are provided as outputs. The skilled person will also appreciate that variations can be made to this approach without digressing from the fundamental concept described here—for example, an alternative output gas to hydrogen could be produced by a modified "hydrogen production system" provided that it was also capable of being consumed as fuel in a suitable generator.

The invention claimed is:

1. A hydrogen production system comprising:
   a hydrocarbon pyrolysis reactor comprising a plasma torch, the hydrocarbon pyrolysis reactor having a hydrocarbon input, an electrical input and at least one hydrogen output, wherein a hydrocarbon is admitted into the plasma torch for electrical decomposition into a plasma comprising hydrogen;

a hydrogen-fuelled generator, and means to provide part of the hydrogen from one of the at least one hydrogen outputs to the hydrogen-fuelled generator, wherein the hydrogen-fuelled generator is adapted to generate an electrical output; and means to provide the electrical output of the hydrogen-fuelled generator to the electrical input of the hydrocarbon pyrolysis reactor.

2. The hydrogen production system of claim 1, wherein the hydrogen-fuelled generator comprises one of an engine, a gas turbine and a fuel cell.

3. The hydrogen production system of claim 1, wherein the hydrocarbon pyrolysis reactor has a first, high purity, hydrogen output and a second, lower purity, hydrogen output.

4. The hydrogen production system of claim 3, wherein the hydrocarbon pyrolysis reactor comprises a hydrogen purification stage to provide the first hydrogen output and the second hydrogen output.

5. The hydrogen production system of claim 4, wherein the hydrogen purification stage comprises a pressure swing adsorption stage.

6. The hydrogen production system of claim 4, wherein the hydrogen production system further comprises a heat exchanger, wherein hydrogen output by the hydrogen production system passes through the hydrogen purification stage after it passes through the heat exchanger.

7. The hydrogen production system of claim 3, wherein a part of the second hydrogen output is provided as fuel for the hydrogen-fuelled generator.

8. The hydrogen production system of claim 3, wherein a part of the second hydrogen output is provided as purge gas for the hydrocarbon pyrolysis reactor.

9. The hydrogen production system of claim 1, wherein the hydrocarbon pyrolysis reactor comprises a liquid metal system after the plasma torch for pyrolysis of hydrocarbons and separation of reaction products.

10. The hydrogen production system of claim 1, wherein the hydrocarbon pyrolysis reactor comprises a purge gas and separation system after the plasma torch for separation of reaction products.

11. The hydrogen production system of claim 1, wherein the hydrocarbon input is a methane input.

12. The hydrogen production system of claim 1, wherein the hydrocarbon input is adapted to receive flare gas.

13. A method of operating a hydrogen production system, comprising:

activating a hydrocarbon pyrolysis reactor comprising a plasma torch using a hydrocarbon input and an electrical input, further comprising admitting a hydrocarbon into the plasma torch and decomposing it into a plasma comprising hydrogen;

providing at least one hydrogen output from the hydrogen production system, and providing hydrogen from one of the at least one hydrogen outputs to a hydrogen-fuelled generator;

generating electrical power at the hydrogen-fuelled generator; and providing electrical power from the hydrogen-fuelled generator to the electrical input to the hydrocarbon pyrolysis reactor.

14. The method of claim 13, wherein providing at least one hydrogen output comprise providing a first, high purity, hydrogen output and a second, lower purity, hydrogen output.

15. The method of claim 14, wherein the first hydrogen output and the second hydrogen output are provided by a pressure swing adsorption stage.

16. The method of claim 14, further comprising providing a part of the second hydrogen output is provided as fuel for the hydrogen-fuelled generator.

17. The method of claim 13, wherein providing electrical power from the hydrogen-fuelled generator comprises powering the plasma torch.

18. The method of claim 13, wherein the hydrocarbon input is a methane input.

19. The method of claim 13, wherein the hydrocarbon input is adapted to receive flare gas.

* * * * *